(12) United States Patent
De Boodt

(10) Patent No.: US 6,339,040 B1
(45) Date of Patent: Jan. 15, 2002

(54) COMPOSITION OF ADSORBENT

(75) Inventor: Marcel De Boodt, Ghent (BE)

(73) Assignee: Metal Adsorbens Promotion Company N.V., Ghent (BE)

( * ) Notice: Subject to any disclaimer, the term of this patent is extended or adjusted under 35 U.S.C. 154(b) by 0 days.

(21) Appl. No.: 09/582,528

(22) PCT Filed: Dec. 24, 1998

(86) PCT No.: PCT/BE98/00205

§ 371 Date: Sep. 18, 2000

§ 102(e) Date: Sep. 18, 2000

(87) PCT Pub. No.: WO99/34913

PCT Pub. Date: Jul. 15, 1999

(30) Foreign Application Priority Data

Dec. 31, 1997 (BE) ............................................. 09701061

(51) Int. Cl.⁷ ........................... B01J 21/16; B01J 20/10; B01J 20/12; B01J 20/14; C04B 33/00
(52) U.S. Cl. ........................... 502/407; 502/80; 502/84; 502/414; 502/527.12; 502/527.13; 502/527.14; 502/527.24; 502/410; 501/141; 106/415; 106/416
(58) Field of Search ............................ 502/80, 84, 407, 502/414, 527.12–527.14, 527.24, 410; 501/141; 106/415, 416

(56) References Cited

U.S. PATENT DOCUMENTS

| | | | |
|---|---|---|---|
| 4,176,090 A | * 11/1979 | Vaughan et al. | 252/455 Z |
| 4,400,297 A | * 8/1983 | Cruz, Jr. | 252/378 R |
| 4,515,633 A | * 5/1985 | Cruz, Jr. | 106/18.26 |
| 4,666,877 A | 5/1987 | Vaughan | 502/84 |
| 4,697,961 A | * 10/1987 | De Boodt et al. | 405/264 |
| 4,839,318 A | 6/1989 | Kawase et al. | 502/62 |
| 5,214,012 A | 5/1993 | Suzuki et al. | 502/62 |
| 5,322,641 A | * 6/1994 | Shiel et al. | 252/514 |
| 5,585,430 A | * 12/1996 | Patel et al. | 524/406 |
| 5,977,003 A | * 11/1999 | Wilshaw et al. | 501/80 |

FOREIGN PATENT DOCUMENTS

| | | |
|---|---|---|
| DE | 42 42 828 | 6/1993 |
| EP | 400244 A1 * | 12/1990 |
| EP | 445621 | 11/1991 |
| EP | 626346 | 11/1994 |
| GB | 2176772 | 1/1987 |
| WO | 93/16797 | 9/1993 |

* cited by examiner

Primary Examiner—Mark L. Bell
Assistant Examiner—Patricia L. Hailey
(74) Attorney, Agent, or Firm—Sughrue Mion, PLLC

(57) ABSTRACT

An absorbing composition containing alumino silicate containing schistose particles having at least partially a layered structure with substantially parallel layers, whereby at least for 30 percent by weight of the alumino silicate containing schistose particles the distance between two structurally adjacent layers is greater than 5 μm, but less than 100 μm, wherein at least 25 percent by weight of the alumino silicate containing schistose particles consist of aluminum containing di-octahedric layers, wherein the particles are provided with metallic flakes, whereby these metallic flakes are at least partially bound onto and between two structurally adjacent layers of the alumino silicate containing schistose particles, and in which at least 50 percent by weight of these metallic flakes have a thickness of 2 to 5 μm, a maximum length or diameter between 6 and 60 μm, and a specific surface area greater than 100 m²/g.

20 Claims, 1 Drawing Sheet

COMPOSITION OF ADSORBENT

BACKGROUND OF THE INVENTION

The present invention concerns a composition of adsorbent containing phyllo-alumino silicate containing schistose particles having at least partially a layered structure with substantially parallel layers, whereby they at least for 30 percent by weight consist of 14 Å phyllo-alumino silicate. The distance between two adjacent structural layers is greater than 5 μm, but less than 100 μm.

SUMMARY OF THE INVENTION

The use of berngite as an absorbing alumino sicilate containing schistose material is known. The preparation of this material requires heating at high temperature (600° C. and more) in a furnace. Such heating requires not only large expenditures, but is also ecologically harmful, because harmful substances and gases are released during heating. Moreover, such heating is very expensive as regards investments (furnace) and as regards the use of fuels. Beringite has an absorption power which is limited.

In the state of the art, there is no mention of the particular effect of the application of specific aluminum particles with a minimum specific surface area of 100 m$^2$/g which are attached onto specific 14 Å phyllo-alumino silicate, neither of a maximum length or diameter of the aluminum particles, nor of a minimum percentage by weight of aluminum containing di-octahedric layers in the 14 Å phyllo-alumino silicate, nor of the distance between two adjacent di-octahedric layers. In the state of the art, there is neither mention of a synergy at relatively low pH (6.5–8.5) between OH groups on the micronised and also etched aluminum plates or particles and the absorption thereof on the heavy metals, which in this way causes a flocculation.

This use of micronised and etched metallic plates or flakes is not limited to aluminum, but is also valid for all other tri- and bivalent metal particles and their alloys, as well as their mixtures (Al—Cu, Al—Cr, Cr, Cu, Cr—Cu, Ni, Ni—Fe, Fe—Cr, etc.).

It has now been found that specific alumino silicate containing schistose particles, which are provided with specific impurities (such as Me, Cu, Zn, Pb, Ni, Cd, Cr) in the crystal lattice, possess excellent sorption efficiency. The invention thus concerns a composition of adsorbent containing alumino silicate containing schistose particles which at least partially have a layered structure, whereby, at least for 30 percent by weight of the alumino silicate containing schistose particles, the distance between two structurally adjacent layers is greater than 5 μm, but less than 100 μm.

The particles consist at least partially of aluminum containing di-octahedric layers. Preferably, at least 25 percent by weight of the particles consist of aluminum containing di-octahedric layers. The particles are provided on their inner and outer layers of metallic particles or flakes or spangles (aluminum, iron, chromium, iron-chromium, Ni, Cr—Ni, Al—Ni, Al—Cu, Al—Cr) with metallic hydroxide ions (hydroxylation), whereby these metallic particles are at least partially bound onto and between two structurally adjacent layers by adhesion or other physicochemical forces. These flakes preferably form a substantially complete metallic layer onto the phyllo-alumino silicate particles. At least 50 percent by weight of the metallic flat particles or flakes have a maximum length or diameter between 6 and 60 μm, a thickness of a few μm (2 to 5), and a specific surface area greater than 100 m$^2$/g, due to the size and the etching.

In the present context, the specific surface area of particles is determined by nitrogen adsorption using the B.E.T. (Brunauer, Emmet, Teller) method, as simplified by Haub and Dümbgen. The apparatus used is the Ströhlein Area-Meter II, available from Ströhlein A. G. in Germany, the manual of which refers to the simplified B.E.T. method.

Alumino silicate containing schistose particles of the sorbent according to the invention are mainly 14 Å di-octahedric alumino silicate with an adequate microporosity and capillarity, onto which and within which hydrolysed metallic particles with OH$^-$ ions (aluminum hydroxide) are physically and chemically adsorbed or bound. The alumino silicate containing schistose particles can contain up to 40,000 ppm of metallic particles. The sorbent contains for example 5,000 to 20,000 ppm of metallic particles or flakes.

The metallic particles or flakes are preferably aluminum or aluminum oxide particles, which after hydroxylation are provided with aluminum hydroxide.

Preferably, at least for 30 percent by weight of the alumino silicate containing schistose particles, the distance between two structurally adjacent layers is greater than 10 μm, but less than 100 μm, for example greater than 5 μm but less than 10 μm. Still better is an average distance between two structurally adjacent layers of the alumino silicate containing schistose particles of about 10–20 μm, while the maximum average length of the metallic (preferably aluminum or aluminum oxide) flakes is between 10 and 60 μm. The metallic flakes are preferably etched particles with a specific surface area greater than 100 m$^2$/g. This specific surface area is preferably greater than 150 m$^2$/g, for example 200 to 500 m$^2$/g. These metallic flakes preferably contain one or several open cavities with an irregular circumference. The diameter of a cavity ( [surface of the cavity/π]$^{1/2}$) is preferably at least two times larger than the diameter of the flakes. The thickness of the walls of the particles around the cavity is for example less than 3 μm.

According to an embodiment, at least 50 percent by weight of the structure of weathered alumino silicate containing schistose particles consist of a 14 Å aluminum containing di-octahedric structure. The degree of weathering is indicated by the substitution of magnesium by aluminum which should at least amount to more than 50%.

Compositions of the adsorbent according to the invention, which are very suitable for the sorption and the fixation of heavy metals, carry aluminum hydroxide ions which are bound to one or several of the following elements: Fe, Cr, Cu, Ni, Co, Sr, Cd, Pb, Zn or Mn. It has been found that the epitaxy or in situ growth of the precipitated heavy metals preferably occurs on the di-octahedric alumino silicate crystal surfaces, on the sites where in the crystal lattice analogous or the same heavy metals occur as natural or artificial impurities, such as Cr, Cu, Ni, Co, Sr, Cd, Pb, Zn or Mn.

At least 50 percent by weight of the aluminum or aluminium oxide particles with hydroxyl ions preferably possess a specific surface area greater than 150 m$^2$/g.

Preferably, in the alumino silicate containing schistose particles, 20 percent by weight of aluminum chlorite is present. For example, in the absorbing composition, at least 50 percent by weight of the alumino silicate containing particles may be aluminum chlorite.

According to an advantageous embodiment, at least 50 percent by weight of the alumino silicate containing schistose particles have a diameter greater than 500 μm. Preferably, the diameter of the particles is less than 2,000 μm.

According to an embodiment, the sorbent comprises porous particles, which show a weak acid reaction (with a pK$_a$ between 4 and 7).

According to another embodiment, the sorbent does or does not comprise adsorbed calcium and/or magnesium containing fertiliser, nitrate fertiliser, phosphate fertiliser, or a mixture thereof.

A composition according to the invention, which is suitable for the fixation of one or several heavy metals, contains di-octahedric phyllo-alumino silicate with as natural impurities in the crystal lattice a total of at least 500 ppm of one or several elements of the following series: Fe, Cr, Cu, Ni, Co, Sr, Cd, Pb, Zn or Mn.

The sorbent may also be mixed with active carbon for specific applications (removal of Hg, etc.).

Preferably, the alumino silicate containing schistose particles for at least 20 percent by weight consist of weathered or not weathered mica or for at least 20 percent by weight of weathered vermiculite.

The particles of the sorbent, according to the intended use, may be smaller or greater than 200 $\mu$m in diameter. The sorbent for examples carries on the free surface 5,000 through 40,000 ppm, preferably 7,550 through 20,000 ppm of hydrolysed metallic flakes, in particular hydrolysed aluminum flakes. Particles of the sorbent smaller than 200 $\mu$m in diameter are very suitable for soil sanitation, whereas particles greater than 500 $\mu$m in diameter are very suitable for water cleanup.

In order to obtain particles with the desired range of diameters, dry sieving, by means of a sieve or sieves with openings having the appropriate diameter(s), may be used.

According to an embodiment, the Al/Si weight ratio of the alumino silicate containing schistose particles is higher than 1/4, but preferably less than 0.8. This ratio may optionally be changed by addition of aluminum and or silicium (in liquid form or solid form—etched flakes of $Al_2O_3$, $SiO_2$ particles).

The metallic etched flakes, such as the aluminum flakes, are preferably bound by adhesion forces or by other physicochemical forces to the alumino silicate containing schistose material.

In order to prevent swelling upon the filtration of the sorbent, stronger binding forces can be used. For example, a binding mass with an Al/Si weight ratio of 0.3 to 1, preferably from 0.3 to 0.4, may be used. This mass further consists of, for example, 25% of $Al_2O_3$, 42% of $SiO_2$, 30% of CaO and/or MgO, and 3% of $Fe_2O_3$. After this treatment, around and partially in the alumino silicate particles, a strong porous coating (containing aluminum hydroxyde) having a high buffering power at a pH of about 8–10.5 and a pressure strength of 10–20 $N/mm^2$, is obtained. The pressure strength is measured using a strain-stress apparatus, type T50001 with digital display, obtainable from J.J. LLOYD INSTRUMENTS Ltd., in Southampton, England. During the measurement, the cross head progresses with a speed of 6 mm per minute.

The invention also concerns a process for the absorption and fixation of one or several of the following elements Fe, Cr, Cu, Ni, Co, Sr, Cd, Pb, Zn or Mn which are present in a medium (liquid medium, soil, etc.) to which a sorbent according to the invention is added. The composition according to the invention is suitable for the simultaneous fixing of nonferrous heavy metals. Preferably prior to, or during the addition of the newly described sorbent to the medium, the pH of the medium is adjusted between 4 and 13, preferably between 4.5 and 8. Because of the natural presence of $CO_2$, or the artificial addition thereof, a solid precipitate of alumino-heavy metal complex on the alumino silicate containing schistose particles may be observed, and/or onto the aluminum flakes bound thereto. For example, in a polluted Ni solution, thus a Ni containing dark precipitate is formed. In the process according to the invention, the absorption process is little or not influenced by temperature fluctuations between about $-1°$ C. (about 0° C.) to 75° C., preferably between 5 and 50° C. The reaction rate of the absorption in the process according to the invention is higher than when using beringite. In examples in which Ni and Pb have to be removed from a polluted water, contact times of 3 to 8 minutes suffice for a sorbent according to the invention to obtain a fairly complete absorption of these heavy metals. In order to obtain the same absorption using beringite, contact times of more than 20 minutes can still be insufficient. With the sorbent according to the invention, after a contact time of 8 minutes, upon filtration removal of heavy metals in excess of 98 and even 99% is observed. For the highly toxic Cd and other elements, the content in the filtrate can successfully be brought down to the limit of measurability (0.001 ppm).

According to an embodiment of the process, one or several heavy metals may be removed in a very efficient way from a polluted aqueous solution. In order to achieve this, the described composition of the sorbent is sufficient to remove the heavy metals considered.

According to an embodiment of the process according to the invention, before, during or after the addition of the new sorbent to the medium, $Fe(OH)_3$ and/or $(NH_4)_2HPO_4$ and/or sodium carbonate is added to the medium, especially to increase the number of bed volumes to be purified.

The process is highly suitable for the sanitation or purification or decontamination of aqueous solutions or suspensions containing one or several sulphates or chloride salts of the following elements Fe, Cr, Cu, Ni, Co, Sr, Cd, Pb, Zn or Mn.

According to a specific embodiment of the process according to the invention, the aqueous solution is percolated through sorbent aggregates. Preferably, these aggregates are mixed with the above mentioned binding mass. Also by means of the sorbent, a polluted suspension and/or a polluted aqueous solution may be purified, either or not with application of regular agitation.

Subsequently, the aqueous solution or suspension is treated (for example by filtration, precipitation, decantation, . . . ) in order to separate the solid particles (loaded sorbents) from the aqueous solution.

According to a specific embodiment, which is suitable for the treatment of aqueous solutions containing one or several heavy metals, the aqueous solution is percolated through one or several bed volumes of sorbent aggregates.

In view of the efficiency of the newly described sorbent (finely sieved particles), soil may be cleaned up by spreading the sorbent onto it, and raking or ploughing it in, for example up to a depth varying from 10 through 50 cm. It should be ensured, that the sorbent is equally distributed in the soil stratum. The treated soil may then be planted with fir trees, so that the pH of the ground is maintained between 4.5 and 6.5. Also sanitations may be performed by repeating the treatment once or several times, so that after 3 to 4 years, normal crops can be grown on a cleaned up soil. The composition according to the invention may also be used for the sanitation of ponds and lakes located in the vicinity of zinc and lead processing industry. For example, 0.5 to 50 g of sorbent is added per liter in these ponds or lakes.

The invention further also concerns a process for the preparation of a sorbent according to the invention. In this process, a) alumino silicate containing schistose particles having at least partially a layered structure, whereby at least for 30 percent by weight of the alumino silicate containing schistose particles, the distance between two structurally adjacent layers is greater than 5 µm, but less than 100 µm, and whereby at least 25 percent by weight of the alumino silicate containing schistose particles consist of aluminum containing 14 Å di-octahedric layers, and b) metallic flakes or particles (preferably aluminum or aluminum oxide flakes) having a maximum length or diameter between 6 µm and 60 µm, with a thickness of 2 to 5 µm and with a specific surface area of at least 100 m$^2$/g are mixed. Subsequently, providing contact with water, a hydrolysis occurs on the metallic flakes. Onto the free surface of the metallic flakes, OH$^-$ ions are formed. This hydrolysis is preferably performed in an aqueous solution with a pH of 4.5 to 8 (preferably of 5 to 6.5). The use of aluminum particles with a maximum diameter below 5 µm is disadvantageous, as these particles to a large extent disappear within the porosity of the carrier material (alumino silicate). In this way, the porosity of the particles is lowered, and the internally formed ions are less efficiently provided for the precipitation, nucleation and epitaxial crystal growth. Aluminium particles with a maximum length or diameter greater than 60 µm or with a thickness greater than 6 µm are also disadvantageous, because the thus formed OH$^-$ ions are insufficiently physically or mechanically bound onto the alumino silicate containing particles.

The hydrolysis of the metallic aluminum particles preferably occurs in an aqueous suspension containing $Al_2O_3$, $SiO_2$, CaO and/or MgO, and further also preferably $Fe_2O_3$, in order to form a binding porous mass or coating in and around the particles. Preferably, this mass has an Al/Si weight ratio of 0.3 to 1, preferably of 0.3 to 0.4. After this treatment, in and around the phyllo-alumino silicate particles a strong porous mass (containing aluminum hydroxide) is obtained, having a high buffering power, for example at about a pH of 8–10.5, and a pressure strength of 10–20 N/mm$^2$.

The process according to the invention is preferably performed at temperatures below 50° C., whereby the alumino silicate containing sorbent particles are not subjected to heating. Such heating leads to an oxidation of the components with an $E_h$ value up to 80–100 millivolts or more, which inhibits the precipitation of heavy metal complexes. In the process according to the invention, the normal reduction circumstances of the schists ($E_h$ value of 20 to 30 millivolts) is left unaltered.

Preferably, the sorbent particles are hydrolysed with an aluminum or aluminum oxide external layer in the presence of at least one of the following elements Fe, Cr, Cu, Ni, Co, Sr, Cd, Pb, Zn or Mn in order to obtain aluminum hydroxide ions, which interreact with at least one of the following elements Fe, Cr, Cu, Ni, Co, Sr, Cd, Pb, Zn or Mn.

Due to the selection of the alumino silicate schists made, the crystal lattice has one or several heavy metals as impurities, such as Cr, Cu, Ni, Co, Sr, Cd, Pb, Zn or Mn. These elements serve as seeds and centre of attraction for equal elements which are precipitated from the water, and by which the epitaxy or in situ growth of the precipitated heavy metals may develop well.

According to an embodiment, the metallic flakes or particles with metallic hydroxide ions are put into a solution with a weak acid or acids with a $pK_a$ between 4 and 7, to control the hydrolysis.

As the hydrolysis may take place in the water to be cleaned, the invention also concerns a composition of adsorbent containing alumino silicate containing schistose particles having at least partially a layered structure, whereby at least for 30 percent by weight of the alumino silicate containing schistose particles, the distance between two structurally adjacent layers is greater than 5 µm, but less than 100 µm. At least 25 percent by weight of the particles consist of aluminum containing di-octahedric layers. The inner or outer layer of the phyllo-alumino silicate particles is provided with metallic particles or flakes or spangles (aluminum, iron, chromium, iron-chromium, Ni, Cr—Ni, Al—Ni, Al—Cu, Al—Cr), whereby these metallic particles are at least partially bound onto and between two structurally adjacent layers by adhesion or other physicochemical forces. At least 50 percent by weight of the metallic flat particles or flakes have a maximum length or diameter between 6 and 60 µm, a thickness of a few µm (2 to 5), and a specific surface area greater than 100 m$^2$/g, due to the size and the etching.

DETAILED DESCRIPTION OF THE INVENTION

Figure 1:
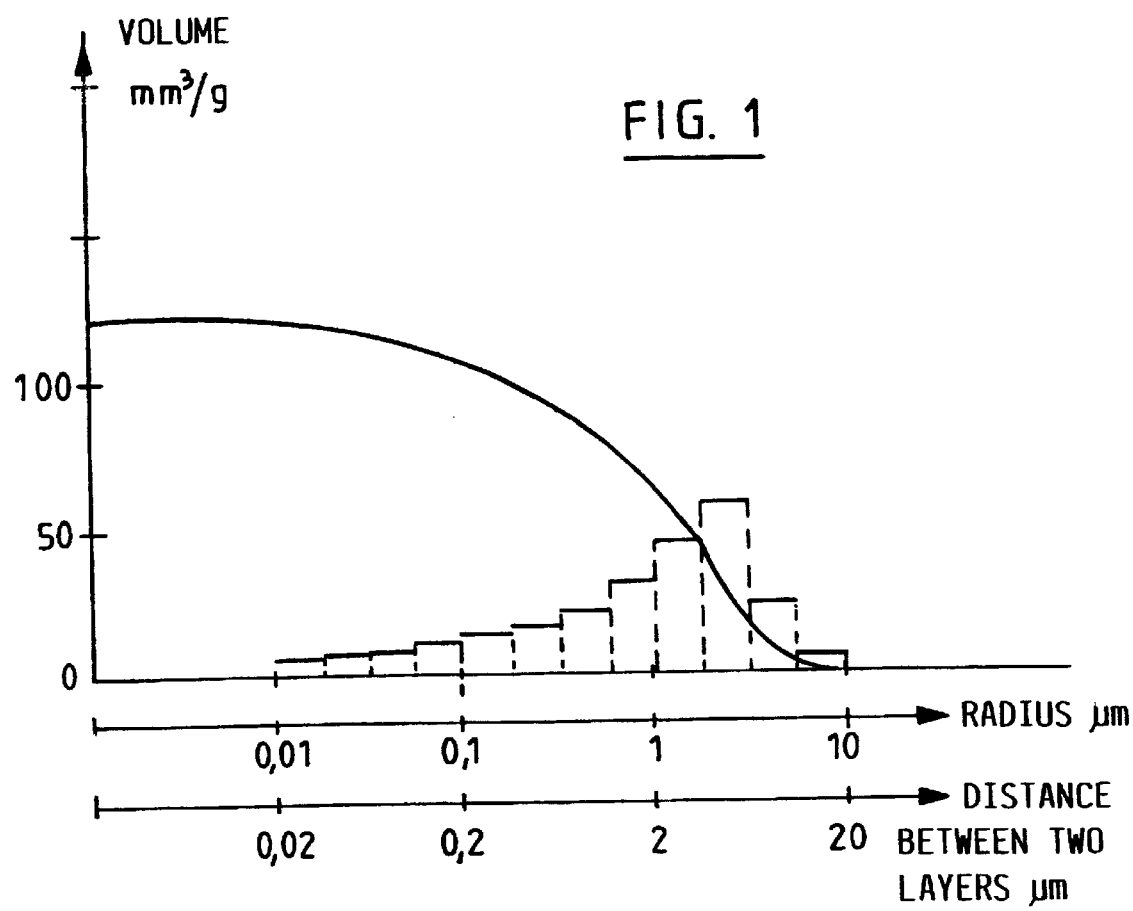
FIG. 1 is a graph showing the distribution of the porosity of aluminum silicates containing schists.

Details of the invention will result from the description of examples given hereinafter.

The invention relates to a new sorbent for heavy metals and for transition metals (in particular only for heavy metals), by which a synergy between the flocculation, the precipitation and the nucleation, by which an absorption, an epitaxy and a fixation onto the crystal lattice is obtained.

The flocculation of heavy metals at a slightly alkaline to alkaline pH is strongly increased when alumino-silicate containing particles, in particular phyllo-silicate particles are present in the solution. This synergic effect is most pronounced, when the alumino silicate consists of a weathered mica, in which Al chlorites and mixed layers of the vermiculite type are apparent. This is significantly better than the presence in decreasing order of smectites and kaolinites.

The precipitation floc is strongly bound when it settles on the above mentioned alumino silicates, which as crystallized schists form the carrier material in which natural impurities, consisting of heavy metals, are present. These react as crystal seeds around which the precipitation floc grows and thus causes epitaxy. In this way, two interesting effects are obtained:

a) because of the crystal growth, the heavy elements content in the solution decreases;

b) the heavy elements are normally retained temporarily on the alumino silicates in an exchange process, while the heavy element or heavy elements through the epitaxy are fixed onto the schists by the crystallization process, i.e. due to the exchange capacity, the exchange is converted into a fixation capacity. This process is increasingly reinforced as the crystal lattice of the schist approaches the desired Al/Si ratio of the Al/Si ratio in which the heavy element normally crystallizes as an alumino silicate ore.

The presence of aluminum hydroxide ions on aluminum or aluminum oxide particles with a maximum length or diameter between 6 and 60 μm, causes yet another effect, viz. the increase of the energetic level of the surface of the schist. This increase immediately also stimulates the hydroxylation and thus also the adsorption. The highly energetic surface of the schists may still be increased by the application of metallic etched particles or flakes consisting of tri- or bi-valent metallic elements, which are readily hydrolysed in the presence of one or several cations of heavy metals, on or at the crystallisation seeds.

The epitaxy is still further stimulated by achieving a more compact floc of the heavy metal in the solution. The denser the floc, the less water molecules will occur between the schist surface and the floc. In order to obtain an even more compact floc, one may add to the solution small amounts of a catalyst which reduces the solubility of the heavy metal or metals, thus reducing the volume of the floc and increasing its density. For each element or group of heavy metals, at the given pH, there is at least one product that causes the desired effect. For example, for Mn this is $(NH_4)_2HPO_4$; for Pb this is $Fe(OH)_3$; for Ni this is sodium carbonate, etc.

The precipitation of the element onto the crystal lattice, by which the heavy element is fixed through epitaxy and crystallization, may be checked by means of the diffraction diagram obtained in an EDAX recording (Energy Dispersive X-ray Analysis).

The microporosity of the adsorbent, being the basic schists, is very important, because of the prior capillary adsorption, when it is in conjunction with a highly energetic surface, due to the natural presence, be it in small amounts, of heavy metals ±100–1000 ppm. These are found, inter alia in certain facies of the westphalian.

The phenomena listed hereafter, viz. flocculation, precipitation, adsorption, absorption, chemical sorption, nucleation, epitaxy, crystal growth, all play a role in the sorption of heavy metals that is not to be spurned. It helps to explain the phenomena observed, but for the quantitative explanation it is a hopeless task. Only the predominance of a certain interaction mechanism may sometimes be indicated . . . In fact, these are phenomena which seemingly occur simultaneously.

In general, in the adsorption affinity, a trend can substantially be observed, according to the electrical potential of the ions, expressed as $Z_2/r$, wherein Z is the valency and r is the radius of the ion (Goldschmidt: Ni>Mg>Cu>Co>Zn>Cd>Sr>Pb). However, this series not faithfully followed, because Cd proves to possess the largest affinity, followed by Co, Ni, Zn>Pb. By the addition of the precipitation catalysts, the order may be changed entirely.

EXAMPLES 1

Westphalian schists consisting of quartz, kaolinite weathered mica turning into mixed layers with vermiculite, are used to make a heavy metal adsorbent.

Those schists (14 Å di-octahedric alumino phyllo silicates) after mechanical crumbling have the following particle size distribution:

100–250 μm: 18 percent by weight,
250–500 μm: 10 percent by weight,
500–1000 μm: 72 percent by weight.

The Al/Si weight ratio of the schists is 0.3. The distribution of the porosity of the aluminum silicates containing schists is represented in FIG. 1. This figure shows the volume (mm³g; as measured by the Hg intrusion method by pressure increase) as well as their respective groups of which the diameter varies between the x and y μm. The total porosity of the schists was about 125–150 mm³/g, of which 60% was formed by pores having a diameter larger than 2 μm. The average diameter of the pores or distance D between two aluminum silicate layers (siloxanes layer X) was about 4 μm.

The composition (percentages by weight) of those schists (density of 0.9) is the following:
$SiO_2$:52
$Al_2O_3$:30
CaO:3.45
MgO:1.48
$K_2O$:2.65
$Na_2O$:4.8 impurities, heavy elements being Mn, Cu, Zn, Co, Ni, Pb and Cr, to a total of 1,500 to 2,000 ppm.

Figure 2:
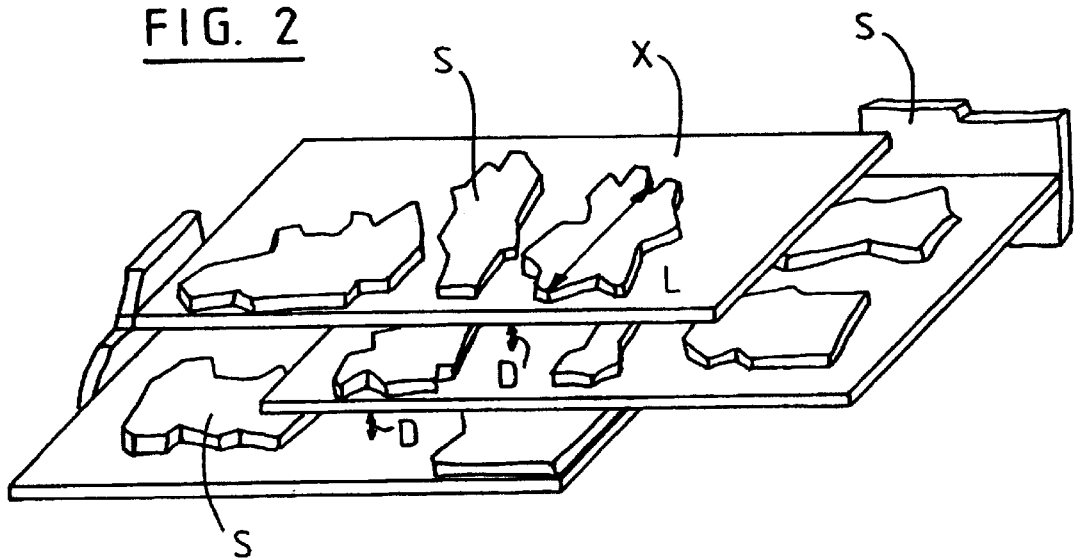
FIG. 2 illustrates aluminum flakes which are mixed with schists to form a metallic aluminum layer on free surface areas of the schists.

These schists are mixed with aluminum flakes (S) (micronised and etched flat particles) to obtain a metallic aluminum layer on the free surface area of the schists (See FIG. 2). The particle size distribution of these flakes (with a specific surface area of 240 m²/g) was the following:

| Maximum length (L) or diameter between A and B in μm | % |
| --- | --- |
| 20–60 | 35 |
| 10–20 | 50 |
| 5–10 | 10 |
| 0–5 | 5 |

These flakes consist of etched aluminum particles with open cavity(ies), of which the circumference is very irregular. The average theoretical diameter of this open cavity was about 10–40 μm.

The alumino silicate particles provided with a fixed metallic aluminum form a sorbent "Boodtite 1", which can be used for the santitation of ponds. The surface area of the Al flakes is at least for 10 to 15% free to contain sufficient OH⁻ ions after hydroxylation.

The alumino silicate particles provided with a fixed metallic aluminum layer were added to an aqueous suspension of a binder substance containing 25% of $Al_2O_3$, 42% of $SiO_2$, 30% of CaO+MgO, 3% of $Fe_2O_3$. After this treatment, around the particles a strong porous mass or coating (containing aluminum hydroxide) is obtained, so that the thus obtained sorbent "Boodtite 2" has a high buffering capacity at a pH of about 8–10.5 and with a pressure strength of 10–20 N/mm².

It comes down to obtaining as much free surface area of the Al flakes as possible, while simultaneously realising with the binder for the aggregate formation, the required strength thereof of 10–20 N/mm². There is consequently no point in making even harder aggregates.

This "Boodtite 2" sorbent is brought into an aqueous solution containing Cu (sulphate salt, chlorine salt) or Zn (sulphate) or Cd (sulphate) or Ni (nitrate) or iron-chromium sulphates, treated to obtain schists of which the surface is provided with flakes that after hydrolysis have reacted with Cu or Zn or Cd or Fe—Cr ions onto which also OH groups are bound. The schists obtained in this way are the following:

Sorbent A

The sorbent aggregates are charged with ±1,000 ppm of Cu sulphate. The Al/Si ratio is 0.3.

Sorbent B

The sorbent aggregates are charged with ±1000 ppm of Cu chloride. The Al/Si ratio is 0.3.

Sorbent C

The sorbent aggregates are charged with ±750 ppm of Zn sulphates. The Al/Si ratio is 0.3.

Sorbent D

The sorbent aggregates are charged with ±750 ppm of Cd sulphates. The Al/Si ratio is 0.3.

Sorbent E

The sorbent aggregates are charged with ±750 ppm of Cd sulphates and ±750 ppm of Cu sulphates. The Al/Si ratio is 0.3.

Sorbent F

The sorbent aggregates are charged with ±750 ppm of Fe—Cr sulphates. The Al/Si ratio is 0.3.

The reduction potential $E_h$ of the schists A, B, C, D, E and F is about 25 mV after treatment Solutions containing respectively 10 ppm of $ZnSO_4$-$7H_2O$, 10 ppm of $CuCl_2$-$2H_2O$ and 10 ppm of $CdSO_4$ are prepared to serve as a percolate on a bed of sorbent aggregates (Sorbents A through F).

By addition of humic acids, these solutions are coloured brown, and enriched with 100 to 200 ppm of $NaCO_3$.

The pH of these solutions is adjusted to 6.5.

These solutions have been percolated over different beds of sorbent aggregates. The efficiency of the absorbing materials was measured by measuring the concentration of heavy metals in the percolate obtained by percolation of 1 volume unit of solution through 1 volume unit of sorbent.

The results of these tests are reported below:

Test I: The pH of the heavy metals solution is increased everywhere to 9.5 and the supernatant liquid is allowed to decant. The heavy metals concentration (ppm) of that supernatant liquid is measured.

Test II: The original solutions with a pH of 6.5 are percolated over natural fine schist particles consisting of 14 Å di-octahedric phyllo-alumino silicate. The heavy metals concentration (ppm) of the percolate is measured.

Test III: The original solutions with a pH of 6.5 are percolated over natural fine schist particles consisting of 14 Å di-octahedric phyllo-alumino silicate which are treated with $AlCl_3$. The heavy metals concentration (ppm) of the percolate is measured.

Test IV: The original solutions with a pH of 6.5 are percolated over natural fine schist particles consisting of beringite. The heavy metals concentration (ppm) of the percolate is measured.

Test V: The original solutions with a pH of 6.5 are percolated over the sorbents A, B, C, D and E respectively. The heavy metals concentration (ppm) of the percolate is measured.

| Solution | I | II | III | IV | V |
|---|---|---|---|---|---|
| 10 ppm Cu | 3.23 | 1.71 | 0.3 | 0.22 | 0.01* |
| 10 ppm Zn | 2.58 | 1.12 | 0.18 | 0.35 | 0.07** |
| 10 ppm Cd | 7.81 | 0.87 | 0.08 | 0.16 | 0.003°° |
| 10 ppm Cd | | | | | 0.002 Cd |
| 10 ppm Cu | | | | | 0.01 Cu° |

*use of the sorbent A or B; **use of the sorbent C; °°use of the sorbent D; °use of the sorbent E.

The efficiency of the sorbent according to the invention is thus 5 to 50 times higher than the efficiency of beringite.

EXAMPLE 2

The following compositions are obtained by mixing of different schists A, B, C and D.

Composition 1:50% of sorbent A+50% of sorbent B

Composition 2:50% of sorbent A+50% of sorbent C

Composition 3:25% of sorbent A+50% of sorbent C+25% of sorbent D

Composition 4:50% of sorbent A+50% of sand

It is found that by mixing, no pernicious phenomena occurred in comparison with the results obtained in example 1. By using sand or other inert particles, the percolation rate through the bed may be increased.

EXAMPLE 3

In this example, an aqueous solution containing 30 ppm of Cd, 30 ppm of Co, 30 ppm of Cu, 30 ppm of Pb, 30 ppm of Zn (in the form of salts, such as chloride, sulphates and nitrates) was contacted with the sorbent "Boodtite 2" in a proportion of 1 volume unit of "Boodtite 2" to 15 volume units of solution.

The pH of the solution had an initial value of 3.8. As a function of the contact time, the percentage of heavy metals which are fixed onto the Boodtite 2 sorbent is calculated from the residual concentration in the percolate.

| Contact time (hours) | Cd | Co | U | Pb | Zn |
|---|---|---|---|---|---|
| 3 | 96.7 | 95.0 | 85.0 | 89.0 | 82.0 |
| 24 | 98.5 | 97.0 | 94.0 | 92.0 | 95.5 |
| 72 | 99.8 | 99.5 | 95.0 | 96.0 | >95 |

After a contact time of 72 hours, 95% or more of the heavy metals are fixed on the "Boodtite 2" sorbent. It should be noted, that after 72 hours of contact with the sorbent the pH has strongly increased, to above 7.

EXAMPLE 4

In this example, an aqueous solution containing 30 ppm of Cd, 30 ppm of Co, 30 ppm of Cu, 30 ppm of Pb, 30 ppm of Zn (in the form of salts, such as chloride, sulphates and nitrates) was contacted with the "Boodtite 2" sorbent in a proportion of 1 volume unit of "Boodtite 2" to 15 volume units of solution.

The pH of the solution has an initial value of 8.9. As a function of the contact time, the percentage of heavy metals which are fixed onto the Boodtite 2 sorbent is calculated from the residual concentration in the percolate.

| Contact time (hours) | Cd | Co | U | Pb | Zn |
|---|---|---|---|---|---|
| 3 | 98.0 | 97.0 | 96.0 | 95.0 | 91.0 |
| 24 | 98.7 | 98.5 | 97.0 | 96.0 | 98.0 |
| 72 | 99.8 | 99.9 | 98.9 | 98.6 | 98.2 |

At an initial pH of 8.9, after a contact time of 72 hours, a average fixation of about 99% of the heavy metals is obtained. This means that, after treatment, about 1.4 ppm of heavy metals in 150 ppm remain in the supernatant liquid.

Since Ni was not included in this example, a separate test was set up, which showed that the Ni affinity precedes the Cu affinity. From the examples 3 and 4, it may be noted that the "Boodtite 2" sorbent has a higher affinity for Cd and Co than for Zn and Pb.

EXAMPLES 5 and 6

The procedure of the tests of examples 3 and 4 has been followed, except that the "Boodtite 1" sorbent is used, and except that the pH of the solutions to be cleaned up are maintained at 5 and 6 respectively. After the addition of the sorbent to the solutions to be cleaned up, the sorbent is provided with OH⁻ ions (by hydroxylation). After a contact time of 72 hours, about 99% of the heavy metals are fixed onto the sorbent.

EXAMPLES of the Process According to the Invention

Process 1

A volume unit of solution containing 10 ppm of $ZnSO_4$-$7H_2O$ and 10 ppm $CdSO_4$ is percolated through a volume unit of sorbent C. This percolation takes place at a temperature of 15–25° C. It is found that the percolate contains less than 0.07 ppm of Zn and less than 0.002 ppm of Cd. This proves that the adsorption of the heavy metals occurs irrespectively of each other. However, this conclusion could already be drawn from the examples 3 and 4.

Process 2

The pH of a solution containing 10 ppm $ZnSO_4$-$7H_2O$ is adjusted to about 9.

50 g of sorbent C per liter of solution is added to the solution. After agitation, precipitation is allowed for 1 hour, followed by decantation, whereby the concentration of Zn in the supernatant liquid is measured. More than 99% of the Zn is fixed onto the sorbent.

From this it may be concluded that polluted water may be purified both by static contact (precipitation) and dynamic contact (percolation).

Process 3

A composition is prepared by the mixing of sorbents A, C and E (fraction with a particle size less than 200 µm), to which calcium-magnesium carbonates, calcium phosphates and calcium nitrates are added. The composition contains 3% of schists A, 3% of schists B, 3% of schists E, 10% of calcium nitrates, 50% of calcium phosphates and 31% of dolomite.

5000 kg of this composition is distributed on 1 ha of polluted sandy soil. This soil contains ±5 ppm of heavy metals (e.g. Cd, Zn, Pb, . . . ) dispersed in the soil over a depth of ±10 cm. The soil is subsequently ploughed, up to a depth of 20 cm. After this operation, 500 kg of calcium phosphates have been distributed on this soil. After the latter operation, fir trees were planted.

For serious cases (soils containing 50 ppm of heavy metals dispersed over a depth of 25 to 50 cm), 20,000 to 50,000 kg of the composition may be added to the soil in order to obtain a very good cleanup.

Process 4

Polluted water is percolated through a solid filtering material over 8 minutes. Breakthrough curves are determined for certain heavy metals. For these heavy metals, these curves at each moment describe the relationship at every moment in time between the amount of pollutants that passed the absorbent, and the heavy metal concentration in the effluent at that moment. These curves then give the number of bed volumes of the pollutant that can pass through the filtering material without the pollutant in the filtrate exceeding the limit of measurability.

The following table gives, for the beringite and for the "Boodtite 2" sorbent, the number of bed volumes for the pollutants, whereby each time, at the level of 5 ppb no detection of heavy metals is still just measurable.

| Heavy metal | Concentration at the start (ppb) | Number of bed volumes of beringite | Number of bed volumes of Boodtite 2 |
|---|---|---|---|
| Cd | 80,000 | 1,200 | >1,300 |
| Co | 90,000 | 1,200 | >1,800 |
| Cu | 14,000 | 1,300 | >1,400 |
| Pb | 410,000 | 800 | >1,000 |
| Mn | 8,500 | 2,600 | 2,600–2,700 |
| Ni | 16,900 | 800 | >1,200 |
| Zn | 50,000 | 800 | >1,400 |

Other Examples

Sorbent G

To manufacture this sorbent, aluminum flakes were used. These flakes consist of etched aluminum particles with open cavity(ies), of which the circumference is very irregular. The mean theoretical diameter of this open cavity was about 10–40 µm.

These flakes are added to an aqueous suspension of binder substance containing 25% of $Al_2O_3$, 42% of $SiO_2$, 30% of CaO+MgO, 3% of $Fe_2O_3$. After this treatment, pelletization and drying, porous pellets containing aluminum hydroxide are obtained, through which the "Boodtite 3" sorbent obtained in this way, has a high buffering power at a pH of about 8–10.5 and a pressure strength of 10–20 N/mm². The "Boodtite 3" sorbent was less efficient than the "Boodtite 2" sorbent.

Sorbents H

The preparation process of example 1 was used to manufacture sorbents containing other metallic flakes. For these sorbents, the following metallic flakes have been used. These flakes consist of etched metallic particles with open cavity(ies), of which the circumference is very irregular. The mean theoretical diameter of this open cavity is about 10–40 µm.

| Sorbent | Metallic elements of the flakes |
|---|---|
| H1 | Cr |
| H2 | Fe—Cr |
| H3 | Ni |
| H4 | Zn—Ni |
| H5 | Al—Ni |
| H6 | Al—Cr |
| H7 | Al—Fe |
| H8 | Al—Cu |

What is claimed is:

1. An absorbing composition containing alumino silicate containing schistose particles having at least partially a layered structure with substantially parallel layers, whereby at least for 30 percent by weight of the alumino silicate containing schistose particles the distance between two structurally adjacent layers is greater than 5 µm, but less than 100 µm, in which the alumino silicate containing schistose particles consist at least partially of aluminum containing di-octahedric layers, the particles being provided with metallic flakes, whereby these metallic flakes are at least partially bound onto and between two structurally adjacent layers of the alumino silicate containing schistose particles, and in which at least 50 percent by weight of these metallic flakes have a thickness of 2 to 5 µm, a maximum length or diameter between 6 and 60 µm, and a specific surface area greater than 100 m²/g.

2. The composition according to claim 1 in which at least 25 percent by weight of the alumino silicate containing schistose particles consist of aluminium containing di-octahedric layers.

3. The composition according to claim 1 in which at least for 30 percent by weight of the alumino silicate containing schistose particles the distance between two structurally adjacent layers is greater than 5 μm, but less than 10 μm.

4. The composition according to claim 1 in which the mean distance between two structally adjacent layers of the alumino silicate containing schistose particles is about 10–20 μm, whereas the maximum length or diameter of the metallic particles is between 10 and 60 μm.

5. The composition according to claim 1 in which at least 50 percent by weight of the structure of the alumino silicate containing schistose particles are 14 Å alumino di-octahedric.

6. The composition according to claim 1 in which on the metallic flakes, OH⁻ions are present.

7. Composition according to claim 6 in which the OH⁻ions of the metallic flakes are bound to one or several of the following elements Fe, Cr, Cu, Ni, Co, Sr, Cd, Pb, Zn or Mn.

8. The composition according to claim 1 in which at least 50 percent by weight of the metallic flakes are etched particles with a specific surface area greater than 150 m²/g.

9. The composition according to claim 1 in which at least 50 percent by weight of the alumino silicate containing schistose particles are aluminum chlorite.

10. The composition according to claim 1 in which at least 50 percent by weight of the alumino silicate containing schistose particles have a diameter greater than 500 μm.

11. The composition according to claim 1 in which the composition contains porous particles having a weak acid reaction with a pKa between 4 and 7.

12. The composition according to claim 1 in which the composition contains magnesium containing particles, nitrate particles, phosphate particles or a mixture thereof.

13. The composition according to claim 1 in which the metallic flakes are aluminium or aluminum oxide flakes.

14. A process for absorbing and fixing one or several of the following elements Fe, Cr, Cu, Ni, Co, Sr, Cd, Pb, Zn or Mu, present in a medium, onto alumino silicate containing schistose particles, in which is added to the medium an absorbing composition containing alumino silicate containing schistose particles having at least partially a layered structure with substantially parallel layers, whereby at least for 30 percent by weight of the alumino silicate containing schistose particles die distance between two structurally adjacent layers is greater than 5 μm, but less than 100 μm in which the alumino silicate containing schistose particles consist at least partially of aluminum containing di-octahedric layers, the particles being provided with metallic flakes, whereby these metallic flakes are at least partially bound onto and between two structurally adjacent layers of the alumino silicate containing schistose particles, and in which at least 50 percent by weight of these metallic flakes have a thickness of 2 to 5 μm, a maximum length or diameter between 6 and 60 μm, and a specific surface area greater than 100 m²/g.

15. The process according to claim 14 in which, before or during the addition of the composition to the medium, the pH of the medium is adjusted between 4.5 and 13.

16. Process according to claim 14 in which, before, during or after the addition of the composition to the medium, Fe(OH)3 and/or (NH₄)2BPO4 and/or sodium carbonate are added to the medium.

17. The process according to claim 14 in which an aqueous solution containing one or several sulphates or chlorides of the following elements Fe, Cr, Cu, Ni, Co, Sr, Cd, Pb, Zn or Mn, is contacted with the absorbing composition.

18. The process according to claim 17, comprising allowing the aqueous solution to percolate through the composition.

19. A process for the preparation of an absorbing composition containing alumino silicate containing schistose particles having at least partially a layered structure with substantially parallel layer, whereby at least for 30 percent by weight of the alumino silicate containing schistose particles the distance between two structurally adjacent layers is greater than 5 μm, but less than 100 μm whereby the alumino silicate containing schistose particles consist at least partially of aluminum containing di-octahedric layers, the particles being provided with metallic flakes, whereby these metallic flakes are at least partially bound onto and between two structurally adjacent layers of the alumino silicate containing schistose particles, and whereby at least 50 percent by weight of these metallic flakes have a thickness of 2 to 5 μm, a maximum length or diameter between 6 and 60 μm, and a specific surface area greater than 100 m²/g, process in which phyllo-alumino silicate containing schistose particles having at least partially a layered structure with substantially parallel layers, whereby, for at least 30 percent by weight of the alumino silicate containing schistose particles, the distance between two structurally adjacent layers is greater than 5 μm, but less than 100 μm, and metallic flakes with a thickness of 2 to 5 μm, a maximum length or diameter between 6 and 60 μm, and with a specific surface area greater than 100 m²/g, are mixed together, whereby the phyllo-alumino silicate particles are provided with metallic flakes, and in which optionally the particles with metallic flakes are subsequently hydrolysed to obtain OH⁻ions on the metallic flakes.

20. The process according to claim 19 in which the particles with aluminum or aluminum oxide flakes are hydrolysed in the presence of at least one element selected from the group consisting of Fe, Cr, Cu, Ni, Co, Sr, Cd, Pb, Zn or Mn.

* * * * *